(12) United States Patent
Prakash

(10) Patent No.: US 7,796,798 B2
(45) Date of Patent: Sep. 14, 2010

(54) FREQUENCY DOMAIN BASED MICR READER

(75) Inventor: Ravinder Prakash, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 11/383,859

(22) Filed: May 17, 2006

(65) Prior Publication Data

US 2007/0267495 A1 Nov. 22, 2007

(51) Int. Cl.
G06K 9/00 (2006.01)
(52) U.S. Cl. .................. 382/139; 382/140; 382/181; 382/276; 382/280
(58) Field of Classification Search ......... 382/139–140, 382/181, 276, 280
See application file for complete search history.

(56) References Cited

U.S. PATENT DOCUMENTS

| | | | |
|---|---|---|---|
| 3,599,147 A | | 8/1971 | Rogers et al. |
| 3,846,752 A | | 11/1974 | Nakano et al. |
| 4,356,472 A | * | 10/1982 | Ku et al. ............... 382/139 |
| 4,454,610 A | * | 6/1984 | Sziklai ............... 382/119 |
| 4,764,973 A | * | 8/1988 | O'Hair ............... 382/229 |
| 4,770,184 A | * | 9/1988 | Greene et al. ............ 600/454 |
| 4,817,176 A | * | 3/1989 | Marshall et al. ......... 382/280 |
| 5,504,318 A | * | 4/1996 | Joseph et al. ........... 235/454 |
| 5,911,013 A | | 6/1999 | Taniiishi |
| 5,932,806 A | * | 8/1999 | Rose et al. .............. 73/599 |
| 6,421,457 B1 | * | 7/2002 | Su ....................... 382/149 |
| 2006/0039580 A1 | * | 2/2006 | Moon et al. ............. 382/100 |

FOREIGN PATENT DOCUMENTS

JP 60173685 9/1985

OTHER PUBLICATIONS

Agrawal et al., "Efficient Similarity Search In Sequence Databases", 1993, Proceedings of the 4th International Conference of Foundations of Data Organization and Algorithms, Springer Verlag, pp. 69-84.*

Hopkins et al. "A Fourier descriptor based character recognition engine implemented under the gamera open-source document processing framework," Jan. 2005, Proc. SPIE Electronic Imaging, Document Recognition and Retrieval XII, vol. 5676, San Jose, CA, pp. 111-118.*

* cited by examiner

*Primary Examiner*—Andrew W Johns
*Assistant Examiner*—Jason Heidemann
(74) *Attorney, Agent, or Firm*—Douglas Lashmit; Hoffman Warnick LLC

(57) ABSTRACT

A system and method for implementing frequency domain based magnetic ink character recognition (MICR). A system is provided that includes: a segmentation system for segmenting inputted MICR data into sets of temporal data for inputted characters; a Fourier system for generating a set of Fourier components from temporal data for an inputted character; a normalization system for normalizing the set of Fourier components to generate a normalized set of Fourier components; and a matching system for comparing the normalized set of Fourier components with each of a set of reference waveforms to determine an identity of the inputted character.

18 Claims, 5 Drawing Sheets

FREQUENCY DOMAIN BASED MICR READER

FIELD OF THE INVENTION

The invention relates generally to MICR (magnetic ink character recognition), and more particularly, to a system and method for implementing a frequency domain based MICR reader.

BACKGROUND OF THE INVENTION

MICR (magnetic ink character recognition) technology is commonly deployed by banks and other financial institutions for reading code line character data, such as account and routing information typically found on bank checks. Because MICR utilizes magnetic, as opposed to optical, information to read character data, MICR readers are generally immune to optical noise.

Single gap MICR readers, which are vastly popular in check processing applications, utilize technology that transduces characters based on temporal signals from a single gap magnetic read-head. Such readers typically implement refined signal processing to improve the accuracy of the read. However, such systems are still vulnerable to noise that can interfere with their character discrimination capabilities.

Accordingly, a need exists for a system and method that provide improved read capabilities for a MICR reader.

SUMMARY OF THE INVENTION

The present invention addresses the above-mentioned problems, as well as others, by providing a system and method for implementing a frequency domain based MICR reader.

In a first aspect, the invention provides a frequency domain based magnetic ink character recognition (MICR) system, comprising: a segmentation system for segmenting inputted MICR data into sets of temporal data for inputted characters; a Fourier system for generating a set of Fourier components from temporal data for an inputted character; a normalization system for normalizing the set of Fourier components to generate a normalized set of Fourier components; and a matching system for comparing the normalized set of Fourier components with each of a set of reference waveforms to determine an identity of the inputted character.

In a second aspect, the invention provides a computer program product stored on a computer usable medium for implementing a frequency domain based magnetic ink character recognition (MICR) system, comprising: program code configured for generating a set of Fourier components from temporal MICR data for an inputted arbitrary character; program code configured for normalizing the set of Fourier components to generate a normalized set of Fourier components; and program code configured for comparing the normalized set of Fourier components with each of a set of reference waveforms to determine an identity of the inputted arbitrary character.

In a third aspect, the invention provides a method of implementing a frequency domain based magnetic ink character recognition (MICR) system, comprising: generating a set of Fourier components from temporal MICR data for an inputted arbitrary character; normalizing the set of Fourier components to generate a normalized set of Fourier components; and comparing the normalized set of Fourier components with each of a set of reference waveforms to determine an identity of the inputted arbitrary character.

In a fourth aspect, the invention provides a method for deploying an application for implementing a frequency domain based magnetic ink character recognition (MICR) system, comprising: providing a computer infrastructure being operable to: generate a set of Fourier components from temporal MICR data for an inputted arbitrary character; normalize the set of Fourier components to generate a normalized set of Fourier components; and compare the normalized set of Fourier components with each of a set of reference waveforms to determine an identity of the inputted arbitrary character.

Accordingly, by analyzing the Fourier components, an arbitrary character can be read by correlating the amplitude data of the Fourier components to reference waveforms. This approach offers automatic noise immunity since any noise is typically found in the higher frequencies which can be easily filtered out. Note that for the purposes of this disclosure, the term "reference waveform" refers to a "set of reference Fourier components."

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
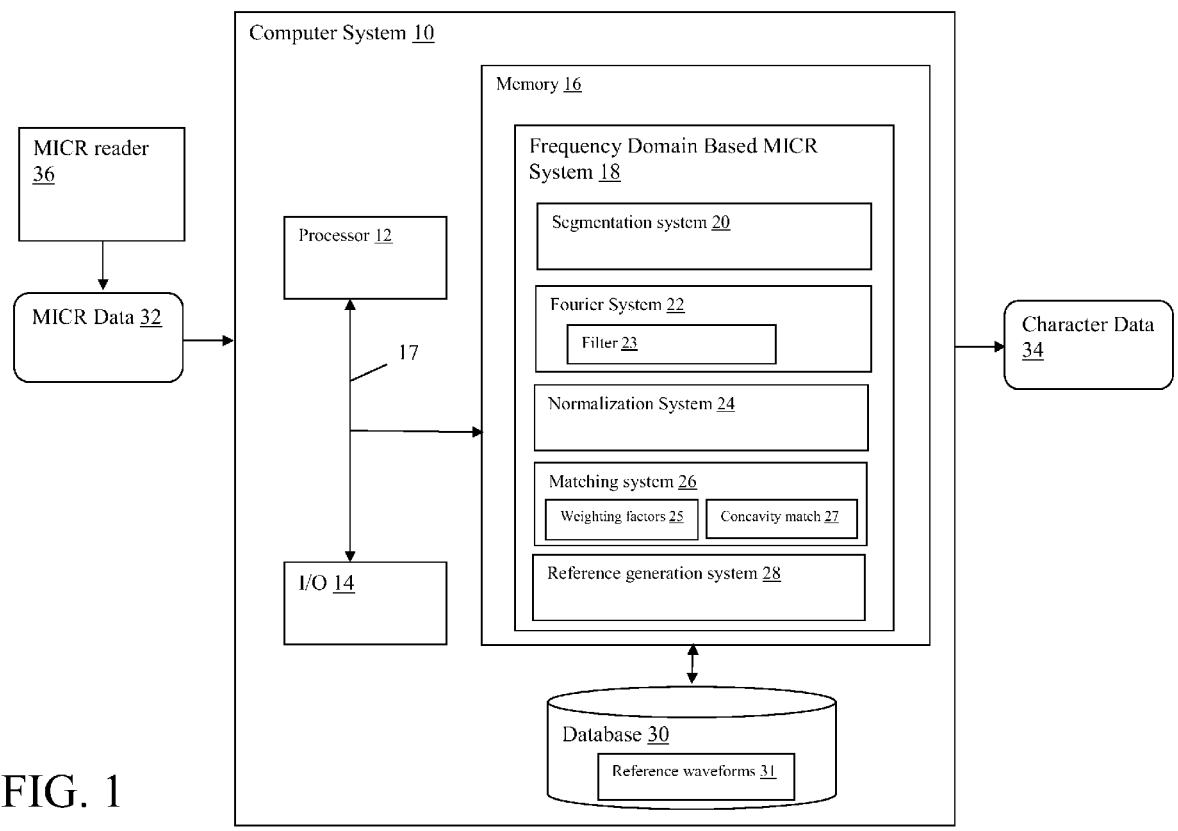
FIG. 1 depicts a frequency domain based MICR reader system in accordance with an embodiment of the present invention.
Figure 2:
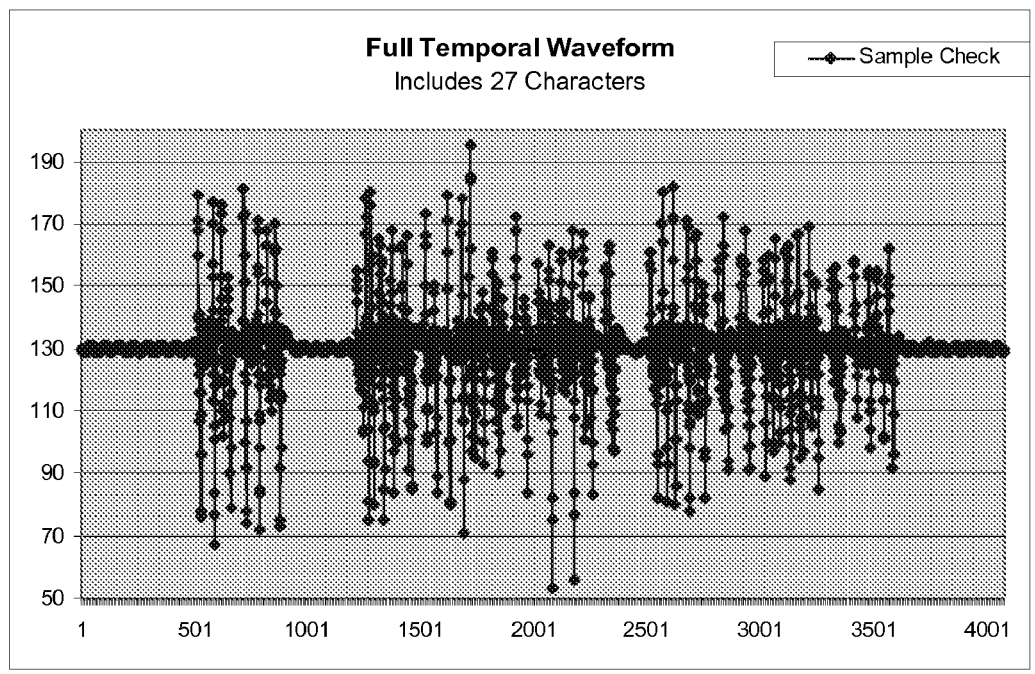
FIG. 2 depicts a typical MICR signal in the temporal domain.
Figure 3:
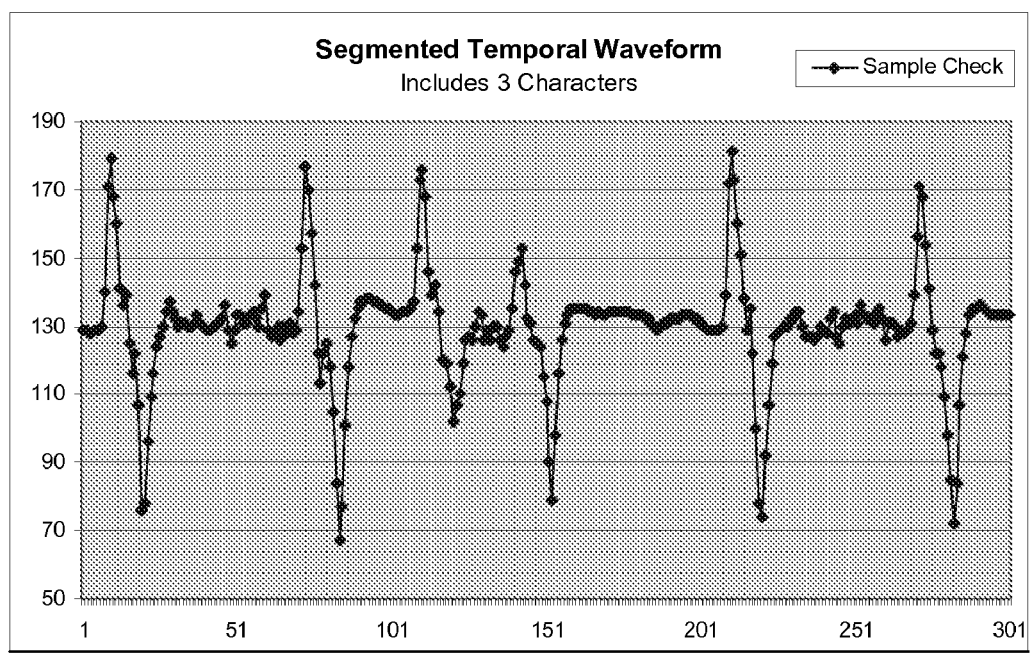
FIG. 3 depicts an expanded view of a portion of the MICR signal of FIG. 2 showing three characters.

Referring now to the drawings, FIG. 1 depicts a computer system 10 having a frequency domain based MICR system 18 that processes inputted MICR data 32 and generates recognized character data 34. MICR data 32 general includes temporal waveform signals obtained from a MICR reader 36 that reads characters printed with magnetic ink, such as those found on the code line of a bank check. For instance, in the case of a single gap MICR reader, magnetic data is collected as the "gap" passes over the code line. In one common, but not limiting, application, code lines are printed using 14 possible characters (0-9 and four special characters) in E13B font. FIG. 2 depicts an example of a temporal waveform obtained from a MICR reader 36 from of a sample bank check having 27 characters in the code line. FIG. 3 depicts a segmented waveform view of three of the characters from the waveform of FIG. 2.

Rather than analyze the waveform data in the temporal domain to perform character recognition, the present invention converts the MICR data 32 into the frequency domain to perform character recognition. To achieve this, frequency domain based MICR system 18 (FIG. 1) includes: a segmentation system 20 that segments the temporal MICR data 32 into individual character data; a Fourier system 22 that converts the individual character data into a set of Fourier components; a normalization system 24 that normalizes the magnitudes of the Fourier components for each character; a matching system 26 that compares the normalized set of Fourier components with a set of reference waveforms 31 representative of a set of possible characters; and a reference generation system 28 for generating the set of reference waveforms 31. Note that for the purposes of this disclosure, the term "reference waveform 31" refers to a "set of reference Fourier components" (i.e., each reference waveform 31 includes a set of discrete values, as opposed to a continuous waveform).

Figure 4:
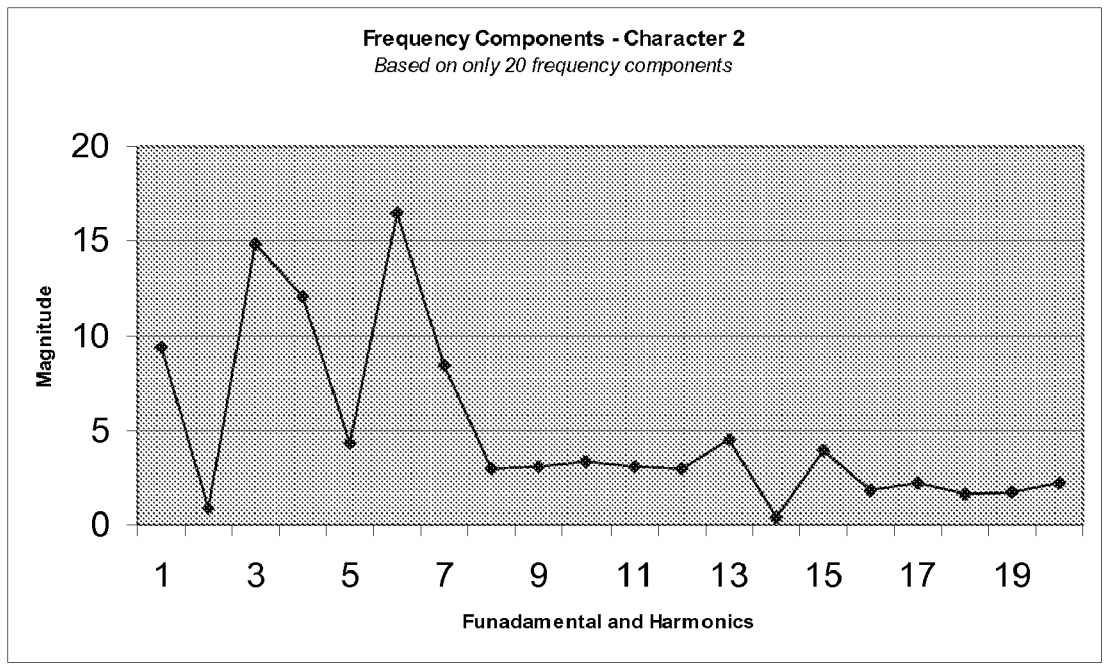
FIG. 4 depicts a waveform of a single character broken down into a set of Fourier components in accordance with an embodiment of the present invention.

FIG. 4 depicts the first 20 frequency components of the character "2" after being read by the MICR reader 36, segmented by segmentation system 20, and converted to the frequency domain by Fourier system 22. In addition, the magnitudes of the amplitudes of the components have been normalized by normalization system 24 such that the sum of the magnitudes of all of the 20 components equals 100. Note that any now known or later developed technique for segmenting the MICR data 32 and converting it to the frequency domain may be utilized. In addition, although this illustrative embodiment normalizes twenty components by having their sums equal 100, any number of Fourier components could be used and any methodology for normalizing the components could be utilized.

Figure 5:
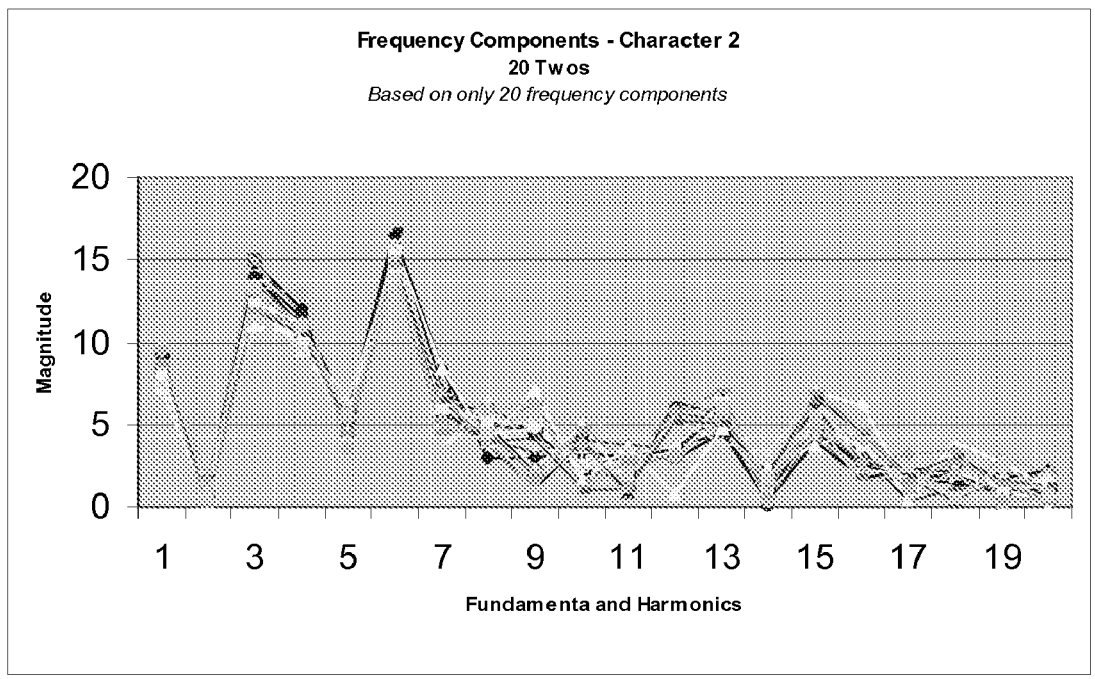
FIG. 5 depicts a set of superimposed waveforms utilized to create a reference waveform for a character in accordance with an embodiment of the present invention.

FIG. 5 depicts 20 superimposed versions of the Fourier components for the character "2." This illustrates that for a given character, the magnetic information is mostly contained in the first six harmonic components (i.e., the fundamental harmonic and the following five harmonics). The sixth harmonic component, and beyond, are largely influenced by noise. Similar behavior is observed for all fourteen E13B characters. Accordingly, in one illustrative embodiment, filter 23 (FIG. 1) eliminates the higher frequency components such that, e.g., only the first six Fourier components of an inputted character are taken into consideration when attempting to recognize the character. Obviously, the specific number components used may vary without departing from the scope of the invention. Regardless of the number used, the magnitudes should be normalized as described above.

A noted above with regard to FIG. 1, a reference generation system 28 is provided to generate a set of reference waveforms 31 (or "profiles") for each possible character. For instance, in the case of E13B there are 14 possible characters, so 14 different reference waveforms 31 would be required. The reference waveforms 31 would only need to be generated once and could for example be stored in database 30. In an alternative embodiment, the reference waveforms 31 could be obtained from a third party source, e.g., downloaded over a network. Regardless of how they are obtained, the reference waveforms 31 are ultimately used by matching system 26 to identify inputted (arbitrary) character waveforms.

In one illustrative embodiment, each reference waveform 31 may be generated by taking an average of N sample waveforms. For instance, as shown in FIG. 5, there are 20 waveforms collected for the character "2." An average of each Fourier component could be readily calculated to create a reference waveform 31.

Figure 6:
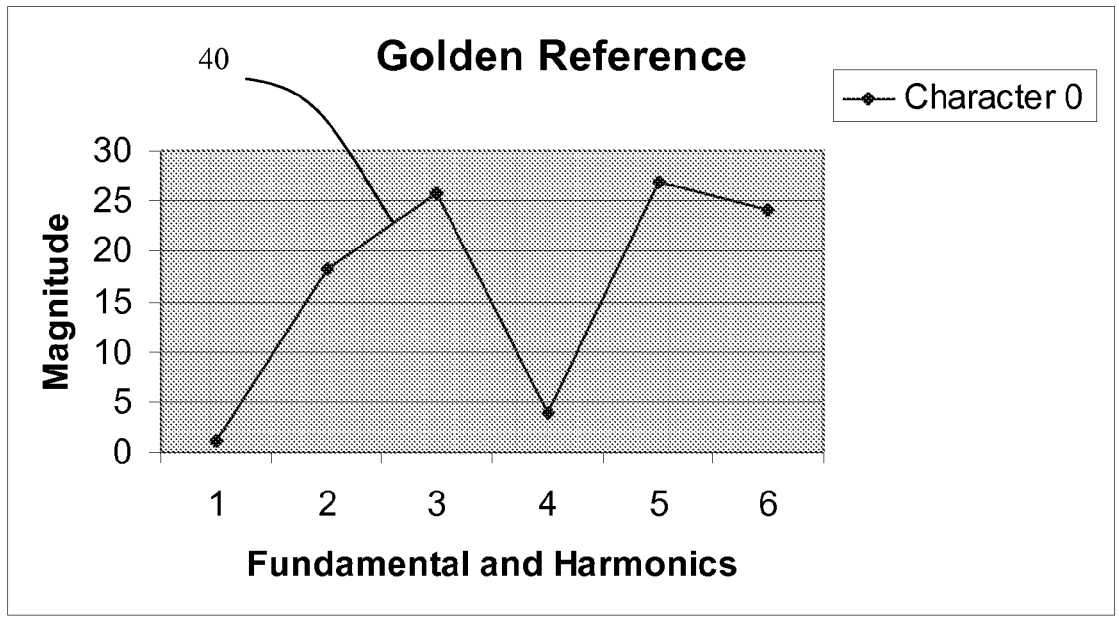
FIG. 6 depicts a resulting reference waveform for the character "0" generated in accordance with an embodiment of the present invention.

FIG. 6 depicts a reference waveform 40 made up of the first six normalized Fourier components (referred to herein as a "golden reference") for the character "0." Thus, in the case of E13B, 14 such golden references would be generated. These golden references could then be compared with an inputted character waveform (i.e., an arbitrary character's Fourier spectrum) by matching system 26 to determine the identity of the inputted character waveform. Thus, in the case of E13B, an inputted character waveform would be matched against each of the 14 possible reference waveforms 31. Namely, the first six normalized Fourier components of the inputted character waveform would be compared to each of the six normalized Fourier components of the 14 golden references.

Figure 7:
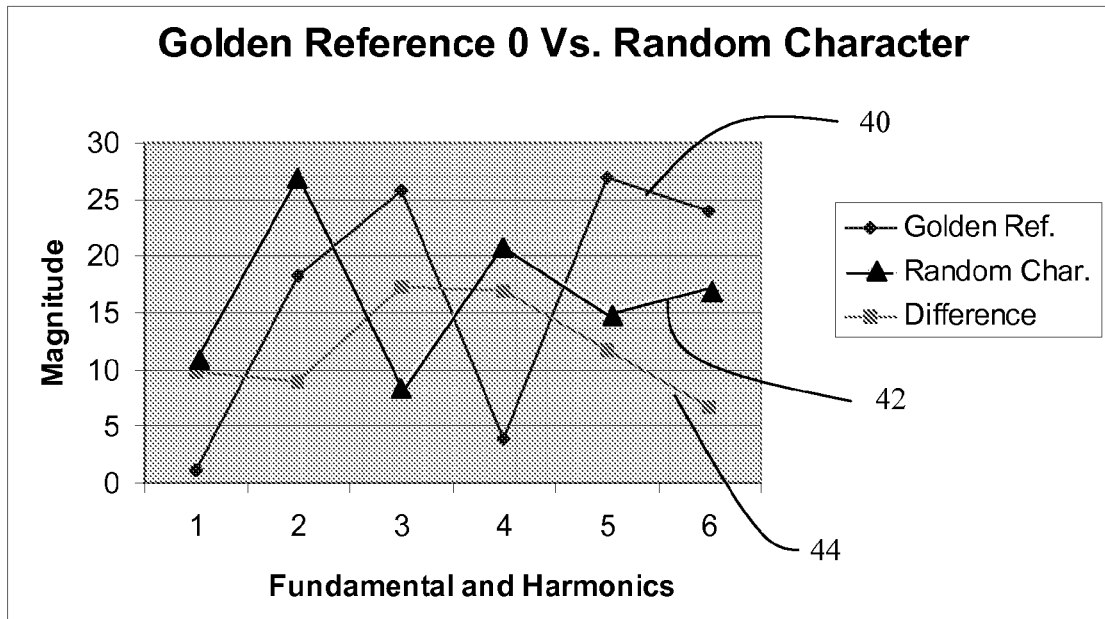
FIG. 7 depicts a set of waveforms utilized to provide a matching operation in accordance with an embodiment of the present invention.

In one illustrative methodology, matching system 26 finds a closest match by calculating an absolute of the difference between the arbitrary character's spectrum and each golden reference. FIG. 7 depicts an example of such a comparison. In this case, a random character's waveform 42 is compared to the golden reference 40 of the character "0" to generate a difference 44. An absolute value or magnitude for each comparison can, for instance, be obtained according the equation:

$$\Sigma\{Diff\_GR_k\}_i = \Sigma |(GoldRef_k)_i - RandomChar_i|$$

where i varies from 1 to 6 and where $\Sigma$ Diff_$GR_k$ corresponds to the summation of absolute amplitude differences against a known golden reference $GR_k$.

Additional modifications or implementations that can be used when matching Fourier component sets include the use of weighting factors 25 and the use of concavity matching 27. For instance, in one illustrative embodiment, different weighting factors 25 may be assigned to the different harmonics that make up the Fourier components in accordance with the summation equation described above. In general, because the lower harmonics incorporate less noise, they can be weighed more heavily when calculating the summation. Thus for instance, the absolute amplitude difference for the first Fourier harmonic i=1 could be weighted by the highest factor (e.g., 2), while the absolute amplitude difference for i=2 could be weighted by a lesser factor (e.g., 1.8), and the absolute amplitude difference for i=3 could be weighted by even a lesser factor (e.g., 1.6), and so on.

In a further illustrative embodiment, concavity matching 27 could also be used to calculate or further enhance the matching process. Concavity matching 27 examines the Fourier components to identify local peaks and valleys, and then assesses penalties or bonuses when comparing waveforms of the two waveforms being analyzed. For example, in FIG. 7, it can be seen that there is a local valley at the fourth Fourier component of the golden reference waveform 40. Conversely, the fourth component of the random character waveform 42 includes a local peak. Thus, a penalty could be assessed by concavity matching 27 when comparing these two waveforms. Conversely, if both the reference waveform and the waveform of the unknown character include a local valley at the same harmonic, then concavity matching 27 could apply a bonus.

Figure 8:
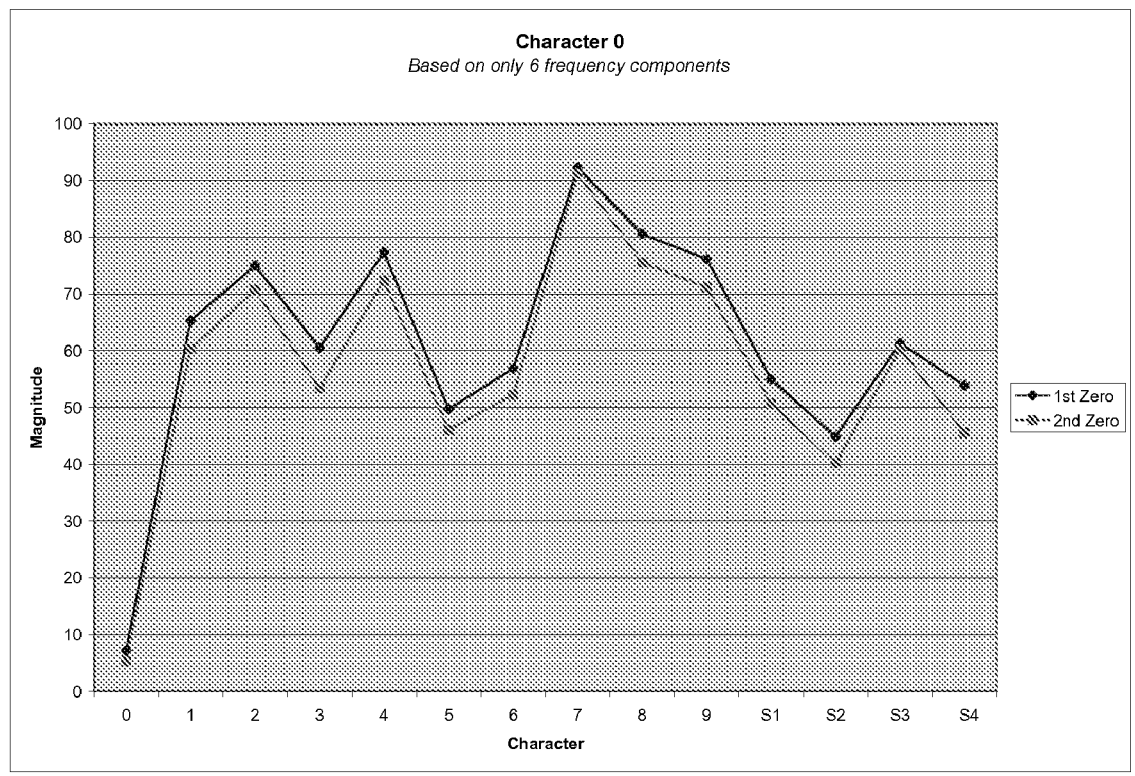
FIG. 8 depicts a plot for determining a closest match between an inputted character and a known character set.

As noted, in the case of E13B, 14 different compare operations would be required to find a closest match since there are 14 possible characters. FIG. 8 depicts a plot of the resulting comparison operations for two arbitrary inputted characters. As can be seen, of the 14 possible "matches," both arbitrary inputted characters most closely match the character "0" Namely, the magnitude of the difference between the inputted characters and "0" is less than 10, while the magnitude of the difference for the remaining 13 characters ranges from 40 to over 90. Read rules can be readily established to offer best read rate and error rate performance.

It is understood that this is but one example of a pattern matching methodology, and any other now known or later developed methodology could be employed without departing from the scope of the invention. It should also be understood that while the invention is generally described with reference to a system and method for reading E13B data, the invention is not limited to any particular font or character set.

Note that computer system 10 of FIG. 1 may comprise any type of computing system, and could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a frequency domain MICR system 18 could be created, maintained and/or deployed by a service provider that offers the functions described herein for customers. That is, a service provider could offer to provide frequency based character recognition as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention clamed is:

1. A frequency domain based magnetic ink character recognition (MICR) system, comprising:
   a computer device having a memory and processor, comprising:
   a segmentation system for segmenting inputted MICR data into sets of temporal data for inputted characters;
   a Fourier system for generating a set of Fourier components from temporal data for an inputted character, wherein the set of Fourier components comprises six components including a fundamental and next five harmonics;
   a normalization system for normalizing the set of Fourier components to generate a normalized set of Fourier components, wherein the normalized set of Fourier components include magnitudes that sum to a predetermined value; and
   a matching system for comparing the normalized set of Fourier components with each of a set of reference waveforms to determine an identity of the inputted character, wherein the set of reference waveforms comprises a corresponding six components including a corresponding fundamental and corresponding next five harmonics, and wherein the comparing, comprises:
      calculating a set of difference value between each component in the normalized set of Fourier components and an associated component in a reference waveform;
      weighting each difference value such that a difference value calculated for a relatively higher Fourier component receives a relatively lower weight;
      summing each of the weighted difference values;
      comparing concavities between the normalized set of Fourier components and each set of reference waveforms; and
      assigning values based upon a degree of concavity matching.

2. The frequency domain MICR system of claim 1, wherein the inputted MICR data is obtained from a single gap MICR reader.

3. The frequency domain MICR system of claim 1, wherein the Fourier system filters out a set of higher frequency Fourier components.

4. The frequency domain MICR system of claim 1, wherein the matching system includes a reference waveform for each character in a character set.

5. The frequency domain MICR system of claim 4, wherein the matching system calculates a difference between the normalized set of Fourier components and each reference waveform.

6. The frequency domain MICR system of claim 4, further comprising a reference generation system for generating each of the reference waveforms.

7. A computer program product stored on a computer readable non-transitory storage medium for implementing a frequency domain based magnetic ink character recognition (MICR) system, comprising:
  program code configured for generating a set of Fourier components from temporal MICR data for an inputted arbitrary character, wherein the set of Fourier components comprises six components including a fundamental and next five harmonics;
  program code configured for normalizing the set of Fourier components to generate a normalized set of Fourier components; and
  program code configured for comparing the normalized set of Fourier components with each of a set of reference waveforms to determine an identity of the inputted arbitrary character, wherein the set of reference waveforms comprises a corresponding six components including a corresponding fundamental and corresponding next five harmonics, and wherein the comparing, comprises:
    calculating a set of difference value between each component in the normalized set of Fourier components and an associated component in a reference waveform;
    weighting each difference value such that a difference value calculated for a relatively higher Fourier component receives a relatively lower weight;
    summing each of the weighted difference values;
    comparing concavities between the normalized set of Fourier components and each set of reference waveforms; and
    assigning values based upon a degree of concavity matching.

8. The computer program product of claim 7, further comprising program code configured for segmenting inputted MICR data into discrete sets of temporal data for individual characters.

9. The computer program product of claim 7, wherein the normalized set of Fourier components include magnitudes that sum to a predetermined value.

10. The computer program product of claim 7, wherein a reference waveform is provided for each character in a character set.

11. The computer program product of claim 10, wherein the program code configured for comparing the normalized set of Fourier components with each of a set of reference waveforms calculates a difference between the normalized set of Fourier components and each reference waveform.

12. The computer program product of claim 10, further comprising program code configured for generating each of the reference waveforms.

13. A method of implementing a frequency domain based magnetic ink character recognition (MICR) system, comprising:
  generating a set of Fourier components from temporal MICR data for an inputted arbitrary character using a computer device, wherein the set of Fourier components comprises six components including a fundamental and next five harmonics;
  normalizing the set of Fourier components to generate a normalized set of Fourier components; and
  comparing the normalized set of Fourier components with each of a set of reference waveforms to determine an identity of the inputted arbitrary character, wherein the set of reference waveforms comprises a corresponding six components including a corresponding fundamental and corresponding next five harmonics, and wherein the comparing comprises:
    calculating a set of difference value between each component in the normalized set of Fourier components and an associated component in a reference waveform;
    weighting each difference value such that a difference value calculated for a relatively higher Fourier component receives a relatively lower weight;
    summing each of the weighted difference values;
    comparing concavities between the normalized set of Fourier components and each set of reference waveforms; and
    assigning values based upon a degree of concavity matching.

14. The method of claim 13, further comprising the initial steps of:
  collecting MICR data from a single gap MICR reader; and
  segmenting collected MICR data into discrete sets of temporal data for individual characters.

15. The method of claim 13, wherein the normalized set of Fourier components include magnitudes that sum to a predetermined value.

16. The method of claim 13, wherein a reference waveform is provided for each character in a character set.

17. The method of claim 13, further comprising the step of generating each of the reference waveforms.

18. A method for deploying an application for implementing a frequency domain based magnetic ink character recognition (MICR) system, comprising:
  providing a computer infrastructure being operable to:
    generate a set of Fourier components from temporal MICR data for an inputted arbitrary character, wherein the set of Fourier components comprises six components including a fundamental and next five harmonics;
    normalize the set of Fourier components to generate a normalized set of Fourier components; and
    compare the normalized set of Fourier components with each of a set of reference waveforms to determine an identity of the inputted arbitrary character, wherein the set of reference waveforms comprises a corresponding six components including a corresponding fundamental and corresponding next five harmonics, and wherein the comparing comprises:
      calculating a set of difference value between each component in the normalized set of Fourier components and an associated component in a reference waveform;
      weighting each difference value such that a difference value calculated for a relatively higher Fourier component receives a relatively lower weight;
      summing each of the weighted difference values;
      comparing concavities between the normalized set of Fourier components and each set of reference waveforms;
      assigning values based upon a degree of concavity matching.

* * * * *